April 12, 1960     G. B. STERLING     2,932,603
HIGH-FOLD ENDURANCE PAPER AND METHOD OF MAKING THE SAME
Filed March 25, 1957
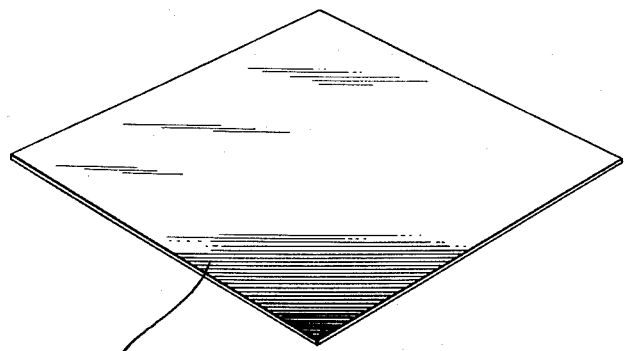
Paper containing copolymer of butadiene-acrylonitrile-methyl isopropenyl ketone.
INVENTOR.
George B. Sterling
BY
Griswold & Burdick
ATTORNEYS

United States Patent Office 2,932,603
Patented Apr. 12, 1960

2,932,603

HIGH-FOLD ENDURANCE PAPER AND METHOD OF MAKING THE SAME

George B. Sterling, Midland, Mich., assignor to The Dow Chemical Company, Midland, Mich., a corporation of Delaware Application March 25, 1957, Serial No. 647,943

6 Claims. (Cl. 162—164)

This invention relates to the production of a high fold endurance paper and to a method of making the same. It relates more particularly to paper containing paper-making fibers and a ternary copolymer of butadiene, acrylonitrile and methyl isopropenyl ketone.

It is known to prepare paper or fibrous sheet material in which dispersed particles of modifying ingredients such as synthetic resins, rubber, polychloroprene, copolymers of styrene and butadiene or copolymers of acrylonitrile and butadiene are deposited on the paper-making fibers while in suspension and before forming them into a sheet.

It has now been found that paper or fibrous sheet material having an exceptionally high fold endurance, together with good tear resistance and tensile strength, can be prepared by mixing with the beaten fibers suspended in an aqueous medium, an aqueous dispersion, suitably a synthetic latex, of a ternary copolymer of from 40 to 60 percent by weight of butadiene, from 15 to 40 percent of acrylonitrile and from 20 to 35 percent of methyl isopropenyl ketone, coagulating the copolymer particles on the fibers in proportions as hereinafter defined and sheeting or running the mixture off on a machine of the paper-making type in the conventional manner. It has further been found that ternary copolymers of the aforementioned monomers when coagulated on the paper-making fibers suspended in an aqueous medium in amounts corresponding to from 25 to 100 parts by weight of the copolymer per 100 parts of the fibers will give a fibrous sheet or paper having a greatly superior fold endurance as compared to a similar sheet made with a copolymer of butadiene and acrylonitrile.

The drawing illustrates a paper made in accordance with the invention.

The copolymer latexes to be employed can be prepared in usual ways such as by polymerizing a mixture of the monomers in an aqueous emulsion employing a usual rubber recipe. The copolymers are preferably prepared in latex form employing a "cold" rubber recipe and carrying out of the polymerization at temperatures between 0° and 15° C. until polymerization of the monomers is complete or substantially complete.

The copolymer latex as usually prepared may contain from 25 to 50 percent by weight of the copolymer, but is diluted, suitably with water containing a small amount of an emulsifying agent, as needed to maintain the copolymer as an aqueous colloidal solution or latex containing from 1 to 10, preferably from 1 to 5 percent by weight of the copolymer when added to, or mixed with the aqueous suspension of the paper-making fibers.

It is important that the copolymer be maintained as an aqueous colloidal solution or latex until thoroughly mixed with the suspended paper-making fibers, then coagulated in admixture with the suspended fibers in order to uniformly distribute the elastomeric copolymer evenly throughout or on the fibers. Thereafter, the suspended fibers having the copolymer material incorporated therewith are formed into a sheet in usual ways such as by running the mixture off on a machine of the paper-making type.

Paper pulp or stock at beaten consistencies containing from 1 to 5, preferably from 1 to 2 percent by weight of fiber solids in the fiber-water suspension can be used in mixing the copolymer latex therewith and precipitation of the elastomeric material from the emulsion.

The latex as previously mentioned is employed in amount corresponding to from 25 to 100 parts by weight of the elastomeric copolymer per 100 parts by weight of the paper-making fibers.

The latex is mixed with the suspension of the paper-making fibers under alkaline conditions, i.e. in an aqueous suspension of the fibers having a pH value between 10 and 12. The latex is usually adjusted to a pH value close to that of the suspension of the paper pulp, e.g. a pH value between 8 and 10 to prevent the copolymer from precipitating and forming balls or clots on the fibers. The addition to the latex of an alkaline stabilizing agent such as sodium aluminate, suitably added as a dilute aqueous solution or non-ionic wetting or emulsifying agents, e.g. Triton X-100, an alkyl aryl polyether alcohol, are advantageous in preventing or inhibiting the formation of a non-uniform precipitate of the copolymer on the paper-making fibers.

In practice, the aqueous suspension of the paper-making fibers, suitably at a beater consistency between 1 and 5 percent by weight of the fibers, is mixed with an alkali such as sodium or potassium hydroxide in amount sufficient to bring the suspension to a pH value between 10 and 12. Thereafter, the latex of the emulsion formed copolymer diluted to a concentration between 1 and 10 percent by weight of the copolymer is added with agitation to effect a thorough mixing of the suspended fibers and the latex. The copolymer is precipitated in admixture with the suspended fibers by adding a dilute aqueous solution of aluminum sulfate or aluminum chloride to the suspension in amount sufficient to bring the resulting mixture to a pH value between 4 and 5. The suspended fibers having the precipitated copolymer particles incorporated therewith is sheeted out or run off on a machine of the paper-making type to form a tough pliable sheet of paper having a high fold endurance.

The following examples illustrate ways in which the principle of the invention has been applied, but are not to be construed as limiting its scope.

EXAMPLE 1

(A) A ternary copolymer of butadiene, acrylonitrile and methyl isopropenyl ketone was prepared by polymerizing a mixture of the monomers in an aqueous emulsion employing the following recipe:

| Ingredients | Parts by Weight |
|---|---|
| Butadiene | 40 |
| Acrylonitrile | 40 |
| Methyl Isopropenyl Ketone | 20 |
| Water | 150 |
| Dresinate 214 (disproportionated rosin soap, potassium salt) | 5.4 |
| Sodium formaldehyde sulfoxylate | 0.2 |
| Versene (ethylenediamine tetra-acetic acid, sodium salt) | 0.4 |
| Diisopropyl benzene Hydroperoxide | 0.4 |
| KCl | 0.225 |
| KOH | 0.15 |
| $FeCl_3 \cdot 6H_2O$ | 0.2 |

The ingredients were placed in an autoclave and vigorously agitated to effect emulsification, then stirred with mild agitation while maintaining the temperature of the mixture at 5° C. for a period of 4.5 hours. Thereafter, the autoclave was opened. The latex was heated to a temperature of 100° C. and steam bubbled therethrough for a period of one hour to distill and separate the unreacted monomers. The conversion was 98.5 percent complete. The latex contained 39.4 percent by weight of polymer solids.

(B) Unbleached kraft pulp was beaten to 600 cc. freeness (Canadian) in a Valley laboratory beater. The pulp was diluted with water to 1 percent consistency and the suspension adjusted to a pH value of 10 with aqueous sodium hydroxide solution. A charge of 600 ml. of the pulp suspension was placed in a glass reaction vessel equipped with a stirrer. A charge of the copolymer latex prepared in part A above was diluted with water to form a solution containing the latex in a concentration of 2 percent by weight. Sixty milliliters of the diluted latex was added to the 600 ml. of the pulp suspension of 1 percent consistency with stirring. Thereafter, an aqueous solution of aluminum sulfate in a concentration of 2 percent by weight was added in amount sufficient to bring the resulting mixture to a pH value of 4.5, thereby precipitating the copolymer. The copolymer-pulp slurry was processed into paper handsheets employing procedure similar to that described in TAPPI specification T205m53. The wet handsheets were pressed for 30 seconds at a pressure of 50 p.s.i., then were dried at 210°–220° F. for 30 minutes. The resulting handsheets were conditioned for 24 hours at 75° F. and 50 percent relative humidity then tested to determine the physical properties for the paper. Tensile strength and elongation were determined by procedure similar to those described in TAPPI standard test T404m50. Internal tear was determined by procedure described in T414m49. Edge tear was determined by procedure described in T470m47. Burst strength was determined by procedure described in T403m53. Fold endurance was determined by procedure described in T423m50.

For purpose of comparison, handsheets were prepared from the paper pulp and Hycar OR 25 latex, an emulsion prepared copolymer of 75 percent by weight of butadiene and 25 percent of acrylonitrile, in similar manner and tested by the same procedures.

The results obtained in the experiments were as follows:

|  | A | B |
|---|---|---|
| Butadiene-Acrylonitrile Copolymer percent | 20 | 0 |
| Butadiene-Acrylonitrile-Methyl Isopropenyl Ketone Copolymer percent | 0 | 20 |
| Paper Weight lbs./ream | 48.8 | 51 |
| Burst Strength (dry) lbs./sq. in. | 38.2 | 45.3 |
| Tensile Strength lbs./sq. in. | 23.0 | 28.4 |
| Elongation percent | 2.6 | 2.2 |
| Internal Tear gms. | 80 | 80 |
| Edge Tear lbs./in. | 5.5 | 5.3 |
| Fold Endurance | 71 | 279 |

EXAMPLE 2

In each of a series of experiments, a copolymer of butadiene, acrylonitrile and methyl isopropenyl ketone, was prepared in the form of a synthetic latex by polymerizing a mixture of the monomers in aqueous emulsion in proportions as stated in the following table, employing a recipe and procedure similar to those employed in Example 1. Handsheets were prepared from unbleached kraft pulp and the copolymer latexes employing procedure similar to that described in Example 1. The handsheets were tested to determine their properties employing procedures similar to those described in Example 1. Table I identifies the handsheets by giving the proportions of butadiene, acrylonitrile and methyl isopropenyl ketone employed in making the copolymer latex, the amount of the copolymer solids, based on the sum of the weights of the copolymer and the paper-making pulp, employed in making the handsheets and the weight of the paper prepared in pounds per ream of the paper. The table also gives the properties determined for the paper handsheets. In the table the symbols MIK, VCN and $C_4H_6$ are employed for brevity to indicate methyl isopropenyl ketone, acrylonitrile and butadiene, respectively.

Table I

| Run No. | Rubbery Copolymer | | | | Product | | | | | | | |
|---|---|---|---|---|---|---|---|---|---|---|---|---|
| | MIK, Percent | VCN, Percent | $C_4H_6$, Percent | Copolymer Solids, Percent | Paper, lbs./ream | Burst Strength | | Tensile Strength, lbs./sq. in. | Elongation, Percent | Internal Tear, gms. | Edge Tear, lbs./in. | Fold Endurance No. |
| | | | | | | wet, p.s.i. | dry, p.s.i. | | | | | |
| 1 | 25 | 15 | 60 | 20 | 49 | 10.4 | 47.8 | 21.2 | 2.4 | 73 | 7.1 | 202 |
| 2 | 35 | 15 | 50 | 20 | 51 | 7.4 | 43.7 | 24.7 | 2.5 | 71.7 | 6.1 | 262 |
| 3 | 20 | 40 | 40 | 50 | 62 | | 50.8 | 29.6 | 3.0 | 74.6 | 7.3 | 427 |
| 4 | 25 | 15 | 60 | 50 | 60 | 16.9 | 51.3 | 23.0 | 3.0 | 70 | 8.3 | 412 |
| 5 | 35 | 15 | 50 | 50 | 58 | 9.0 | 39.9 | 19.0 | 2.8 | 61.5 | 9.1 | 583 |

I claim:

1. A fibrous sheet containing paper-making fibers and a copolymer of from 40 to 60 percent by weight of butadiene, from 15 to 40 percent of acrylonitrile and from 20 to 35 percent of methyl isopropenyl ketone, in amount of from 25 to 100 parts by weight of the copolymer per 100 parts of the paper-making fibers, said sheet being formed from an aqueous suspension of a mixture of paper-making fibers and a synthetic latex of the copolymer.

2. A fibrous sheet as claimed in claim 1, wherein the copolymer contains in chemically combined form approximately 40 percent by weight of butadiene, 40 percent of acrylonitrile and 20 percent of methyl isopropenyl ketone.

3. A fibrous sheet as claimed in claim 1, wherein the copolymer contains in chemically combined form approximately 50 percent by weight of butadiene, 15 percent of acrylonitrile and 35 percent of methyl isopropenyl ketone.

4. A method of making a fibrous sheet which comprises mixing a synthetic latex of a copolymer of from 40 to 60 percent by weight of butadiene, from 15 to 40 percent of acrylonitrile and from 20 to 35 percent of methyl isopropenyl ketone with an aqueous suspension of paper-making fibers in amount corresponding to from 25 to 100 parts by weight of the copolymer solids per 100 parts by weight of the paper-making fibers, coagulating the latex in admixture with the suspended fibers and thereafter forming a sheet from the resulting suspended materials.

5. A method as claimed in claim 4, wherein the paper-making fibers are unbleached kraft pulp.

6. A method as claimed in claim 4, wherein the paper-making pulp is employed in beater consistencies between 1 and 2 percent by weight of fiber solids and the copolymer latex is used in a concentration between 1 and 5 percent by weight of the copolymer solids.

References Cited in the file of this patent

UNITED STATES PATENTS

| 2,385,695 | Dreisbach | Sept. 25, 1945 |
| 2,437,421 | D'Alelio | Mar. 9, 1948 |
| 2,635,045 | Bixler | Apr. 14, 1953 |
| 2,776,295 | Wicklatz et al. | Jan. 1, 1957 |
| 2,791,571 | Wheelock et al. | May 7, 1957 |